United States Patent
Herington et al.

(10) Patent No.: US 9,280,662 B2
(45) Date of Patent: Mar. 8, 2016

(54) AUTOMATIC ISOLATION OF MISBEHAVING PROCESSES ON A COMPUTER SYSTEM

(75) Inventors: Daniel E. Herington, Richardson, TX (US); John R. Diamant, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 3183 days.

(21) Appl. No.: 11/409,351

(22) Filed: Apr. 21, 2006

(65) Prior Publication Data
US 2007/0250929 A1    Oct. 25, 2007

(51) Int. Cl.
*G06F 11/00* (2006.01)
*G06F 21/55* (2013.01)
*G06F 21/56* (2013.01)

(52) U.S. Cl.
CPC ............ *G06F 21/554* (2013.01); *G06F 21/566* (2013.01); *G06F 2221/2149* (2013.01)

(58) Field of Classification Search
CPC .......... G06F 21/554; G06F 2221/2149; G06F 21/566
USPC .................. 713/22, 23, 24, 25, 188; 709/224
See application file for complete search history.

(56) References Cited

U.S. PATENT DOCUMENTS

| | | | |
|---|---|---|---|
| 2006/0161988 A1* | 7/2006 | Costea et al. | 726/25 |
| 2007/0226773 A1* | 9/2007 | Pouliot | 726/1 |
| 2009/0038011 A1* | 2/2009 | Nadathur | 726/24 |

OTHER PUBLICATIONS

Liang et al. "Isolated Program Execution: An Application Transparent Approach for Executing Untrusted Programs," Published in 2003, pp. 1-10.*
Hu et al. "Detecting Unknown Massive Mailling Viruses Using Proactive Methods" pp. 82-101, Published in 2004.*
"Process Migration," by Dejan S. Milojicic, Fred Douglis, Yves Paindaveine, Richard Wheeler and Songnian Zhou, published in ACM Computing Serveys, col. 32, No. 3, Sep. 2000, pp. 241-299 (ISSN 0360-0300).

* cited by examiner

*Primary Examiner* — Baotran N To
(74) *Attorney, Agent, or Firm* — Fulbright & Jaworski, L.L.P.

(57) ABSTRACT

When a computer system process is acting contrary to the rules established for that process for the resource it is running on, the process is moved to a quarantined section and its continued operation is isolated from other processes. While in isolation, the quarantined process is tested and appropriate action, such as, for example, rehabilitation, change of the rules, or termination, is performed. The divided quarantined sections are used for each misbehaving process.

26 Claims, 2 Drawing Sheets

AUTOMATIC ISOLATION OF MISBEHAVING PROCESSES ON A COMPUTER SYSTEM

FIELD OF INVENTION

This invention relates to computer system process control and more particularly to systems and methods for isolation of misbehaving processes.

DESCRIPTION OF RELATED ART

Computer application processes sometimes misbehave. This can be manifested in sudden abnormal consumption of resources or unexpected access or modification to resources or files that exceed normal parameters. A misbehaving application process running on a computer system can negatively impact the normal running of other applications running on the system. Typically, this is handled by automatically shutting down any process that is determined to be misbehaving followed by manual analysis and remediation of the possibly attacked/compromised system.

Such an approach has the disadvantage of possibly disrupting the system when the process is, in fact, running correctly. A further disadvantage of turning the process off is that it then becomes more difficult to diagnose why the process was misbehaving.

An alternative to automatic shutdown of the process is a manual shutdown. This generally takes much longer to accomplish thus, leaving the system vulnerable for a period of time.

BRIEF SUMMARY OF THE INVENTION

When a computer system process is acting contrary to the rules established for that process (for the resource it is running on) the process is moved into quarantine and allowed to continue functioning isolated from other processes. While in isolation, the quarantined process is tested and appropriate action, such as, for example, rehabilitation, change of the rules, or termination, is performed. In this context, rehabilitation can take many forms, such as reconfiguring a process that is misbehaving to stop it's misbehavior in the future, assuming misbehavior was accidental; or replacing a compromised copy of the application with an uncompromised copy (e.g., replace a virus-infected version with an uninfected version). Different quarantine zones are used for each misbehaving process in order to avoid contamination between misbehaving processes.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
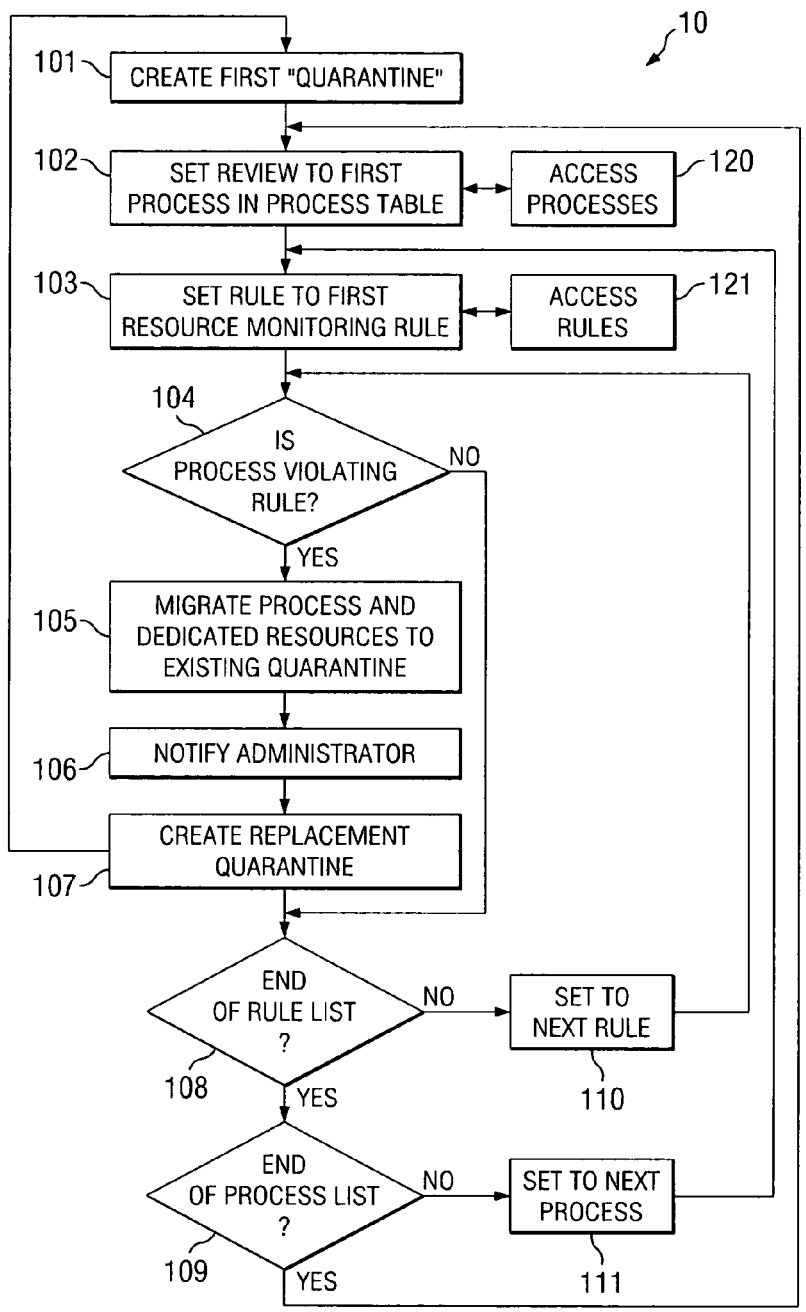
FIG. 1 shows one embodiment of a process for controlling quarantine zones for misbehaving processes.

FIG. 1 illustrates one embodiment 10 of a method for identifying and quarantining an application process which is violating rules of the system. In the embodiment, one quarantine 201 (FIG. 2) is always pre-created while the other processes, such as processes 1-4 and resources, such as resources 1-8, run in partition 200.

Figure 2:
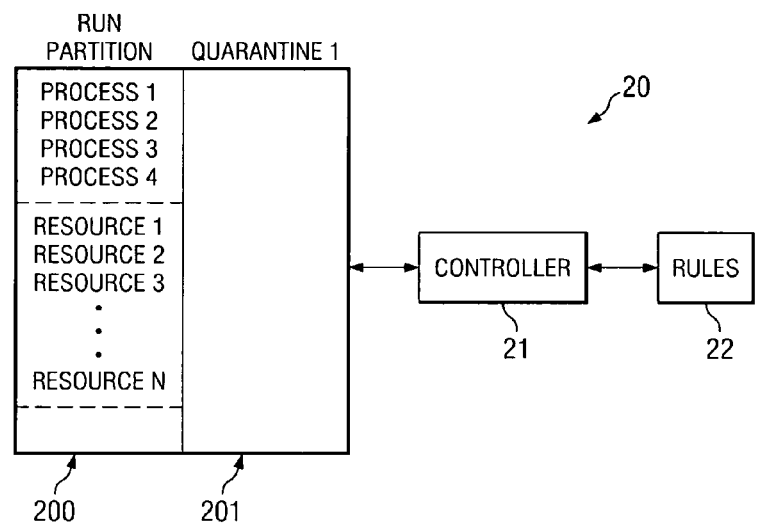
FIGS. 2 and 3 show embodiments of quarantined zones.

As shown in FIG. 2 no resources have been assigned to quarantine 201 at this point so as to not impact partition 200 more than is necessary. Pre-creating an unused and minimal resource consuming quarantine maximizes quarantining performance once a problem is detected without taking undue resource load from the system for unused quarantines. The creation of a separate quarantine using a single CPU, system or machine can be by creating different instances of an operating system (OS) and/or creating containers or partitions using a single instance of an OS.

The article, "Process Migration," by Dejan S. Milojičić, Fred Douglis, Yves Paindaveine, Richard Wheeler and Songnian Zhou, published in ACM Computing Surveys, Column 32, No. 3, September 2000, pages 241-299 (ISSN 0360-0300), which is hereby incorporated by reference herein, discusses the migration of processes between machines for various purposes, such as, for example, dynamic load distribution, by migrating processes from overloaded nodes to less loaded ones; fault resilience, by migrating processes from nodes that may have experienced a partial failure; improved system administration, by migrating processes from the nodes that are about to be shut down or otherwise made unavailable, and data access locality, by migrating processes closer to the source of some data.

Returning to FIG. 1, block 102 sets the rule review to the first process in the process table as maintained, for example, by block 120. Block 103 sets the rule, as maintained, for example, by block 121, to monitor the first resource using the latest version of the rules. Block 104 determines if the process violates the rule being checked. If not, then block 108 determines if it is the end of the rule list. If it is not, the next rule is set, via block 110, and the system continues to iterate via blocks 104, 108, and 110 until all of the rules have been checked for the first application process.

When that occurs, block 109 determines whether it is the end of the process list. If it is not, then block 111 sets the next process and blocks 103, 104, 108, 109 again reiterate until all of the rules for all of the processes have been checked. Block 109 then redirects the system to repeat via block 102.

Figure 3:
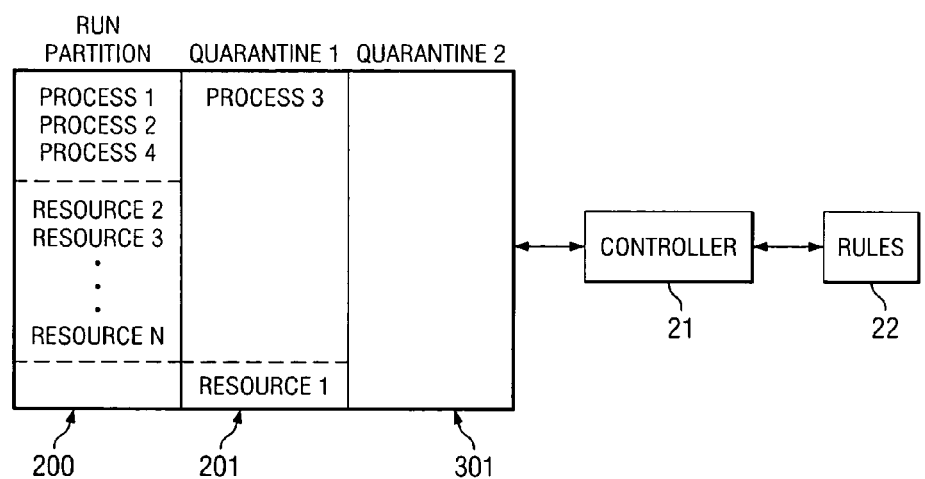

If at any time block 104 determines a process (for example, process 3) is violating a rule, then misbehaving (or potentially misbehaving) process 3 is moved to a dedicated partition, such as partition 201 (FIG. 3). Any migration system or method can be used for such a purpose and such migration techniques are well know to most skilled in the art. Misbehaving processes (or fault conditions) can be intentional or unintentional and can be caused by many factors, including viruses, worms, etc., all of which cause the process to act improperly as defined by the rules.

FIG. 2 depicts a computer system 20 having a controller 21 and rules 22. Computer system 20 is divided into a run partition 200 and a quarantine 1. FIG. 3 depicts computer system 20 after a process 3 and a resource 1 have been moved to quarantine 1 and a new quarantine 2 has been created.

At this time, if the process (for example process 3) is using a resource, then that resource is migrated to partition 201. This then allows process 3 to continue to be active so that remedial action can be taken after observation of the process. This can be done manually by an administrator or automatically under administrative control. At the same time, block 106 notifies the administrator to take appropriate action.

Note that while the quarantine in the embodiment is shown in a partition, in reality the quarantine need only be security and resource isolated from the main system and a partition in the sense that HP, IBM, and others use that term is only a subset of the possible implementations. For example, a quarantine could be implemented within a virtual machine running on the main operating system.

When the administrator is notified of a quarantined process the administrator (either manually or automatically) examines the quarantined process using security tools (such as integrity checkers, intrusion detection, etc.) as well as conventional system administrator tools to decide what to do with the suspect process. The administrator can then either adjust the resource rules so the quarantined process will not trigger even if it is returned to the normal pool, or the administrator can perform forensics and shut down the process or the administrator can take any number of actions. Remedial actions that could be taken include: disinfecting said process, such as via antivirus software or by reinstalling and migrating active data to the disinfected process; declaring the entire computer system compromised and initiating disaster recovery disinfection procedures (such as clearing off the computer and replacing it with an uncontaminated backup, possibly restored from backup media); and allowing the process to run in the quarantine with limited or non-existent external access while forensics are performed on the process to determine the nature of the infection (diagnostics and virus isolation). The administrator has numerous choices and the ones described here are merely some of the options available. The system will update the rules without restarting the system and if appropriate, the misbehaving process can be returned to the main partition if the administrator so chooses.

Block 107 creates a replacement quarantine, such as quarantine 301, FIG. 3, in preparation for the next detected misbehaving (or potentially misbehaving) process. The reason for keeping different quarantines is so that a process can be isolated without fear of that process infecting (or being infected by) another process. Thus, each quarantined process is put in a separate quarantine to prevent cross-contamination in case one process is really misbehaving and the second was misdiagnosed by the rules. If each quarantined process is put in the same quarantine and any process is found to be compromised, none can be trusted, since they may all have been infected. Using a single quarantine reduces the quarantine overhead, but ultimately provides less protection. However, the system could work with only one quarantine if desired.

Note that in embodiment 10 (FIG. 1) all resource rules are checked against each process, rather than all processes being checked against a single rule (the rules are the inside loop and the process the outside loop). This is a design choice, but was used because such a procedure most naturally fits into how process scheduler's examine processes and only requires the addition of a few extra procedures in a process scheduler's responsibilities it should be understood that variations of the ordering of steps and nesting of loops are part of the same inventive concept.

What is claimed is:

1. A method for isolating process fault conditions in a computer system, said method comprising:
   creating a first quarantine within said computer system;
   while said first quarantine is empty, determining that a possible fault condition exists with a first active process; and
   in response to said determining, moving said first active process into said first quarantine.

2. A method as recited in claim 1 wherein said moving involves maintaining said first process active.

3. A method as recited in claim 2 further comprising:
   analyzing said potential fault condition while said first process remains active within said first quarantine.

4. A method as recited in claim 3 further comprising:
   removing said first process from said first quarantine when said analyzing has determined that a possible fault condition no longer exists with respect to said first process.

5. A method as recited in claim 3 further comprising:
   modifying rules used to determine said possible fault condition.

6. A method as recited in claim 5 wherein said modifying is based upon said analyzing.

7. A method as recited in claim 1 further comprising:
   creating a second quarantine within said computer system when a process is moved to said first quarantine.

8. A method as recited in claim 7 further comprising:
   determining that a possible fault condition exists with a second active process; and
   moving said second active process to said second quarantine upon said determining.

9. A method as recited in claim 1 wherein said computer system has at least one operating system (OS) and wherein said quarantine is created within a single instance of a particular OS.

10. A method as recited in claim 1 wherein said computer system has at least one operating system (OS) and wherein said first quarantine is created using multiple operating systems within said computer system.

11. A method for isolating processes on a computer system, said method comprising:
    creating an isolation zone;
    after creating said isolation zone, determining that a process is acting improperly; and
    moving a process determined to be acting improperly to said isolation zone on said computer system, said isolation zone allowing said process to continue operating, but preventing such operation from contaminating other processes or data on said computer system.

12. A method as recited in claim 11 further comprising:
    determining if said improperly acting process is in fact acting improperly while said process is contained within said isolation zone.

13. A method as recited in claim 11 further comprising:
    removing said improperly acting process from said isolation zone at a point in time when it is determined that said process no longer acts improperly.

14. A method as recited in claim 12 further comprising:
    taking remedial action upon a determination that said process continues to act improperly.

15. A method as recited in claim 14 wherein said remedial action is selected from the list consisting of:
    turning said process off, limiting access of said process to certain resources, reducing the number of instances of said process that can be active at any one time, changing the rules pertaining to said process, disinfecting said process, initiation of disaster recovery for said computer system, allowing the process to run while performing diagnostics thereon.

16. A computer system comprising:
    a processor;
    a run partition;
    a first quarantine partition;
    at least one application running on said run partition;
    a plurality of resources assigned to said run partition available to said application;
    rules for determining when any of said resources or any of said applications behave in an unexpected manner; and
    a controller for moving from said run partition to said first quarantine partition a resource or an application determined to behave in an unexpected manner.

17. A system as recited in claim 16 wherein said rules include rules for checking resource usage or security rules against each said application in an iterating manner.

18. A system as recited in claim 16 wherein said controller further provides for:
   creating separate quarantine partitions; and
   moving each said application determined to behave in an unexpected manner to an individual one of said separate quarantine partitions.

19. A system as recited in claim 16 wherein said controller further provides for taking remedial action with respect to applications in a quarantine partition.

20. A system as recited in claim 16 wherein said controller further provides for:
   in response to a determination that said any of said resources or said application is behaving in an unexpected manner, creating a second quarantine partition;
   determining that a possible fault condition exists with a second application; and
   moving said second application to said second quarantine upon said determining.

21. A system as recited in claim 20 wherein said controller further provides for returning a removed one of said applications or resources to said run partition and outside of said first quarantine zone if said application or resource has been remediated.

22. A system as recited in claim 16 wherein said controller further provides for:
   measuring said unexpected manner is against rules; and
   adjusting one or more of said rules based on an analysis of an application in a quarantine partition.

23. A computer program product comprising non-transitory tangible computer-readable storage media encoded with computer-readable code configured to be executed on a processor, said code including:
   code for determining that a process running on a computer is acting improperly; and
   code for moving a process determined to be acting improperly to a first isolation zone created on said computer before it is determined that said process is acting improperly, said isolation zone allowing said process to continue operating, but preventing such operation from contaminating other processes or data on said computer.

24. A computer program product as recited in claim 23 wherein said code includes:
   code for determining if said improperly acting process is in fact acting improperly while said process is contained within said isolation zone.

25. A computer program product as recited in claim 23 wherein said code is further configured to:
   in response to a determination that said process is behaving in an unexpected manner, creating a second quarantine partition;
   determining that a possible fault condition exists with a second active process; and
   moving said second active process to said second quarantine in response to said determining.

26. A computer program product as recited in claim 24 wherein said code includes:
   code for taking remedial action upon a determination that said process continues to act improperly.

* * * * *